(12) United States Patent
Yi et al.

(10) Patent No.: US 9,840,168 B2
(45) Date of Patent: Dec. 12, 2017

(54) CONNECTION MECHANISM

(71) Applicants: Ze-Hua Yi, Guangdong (CN); Zhi-Ren Zhong, Guangdong (CN); Wanquan Zhu, Guangdong (CN)

(72) Inventors: Ze-Hua Yi, Guangdong (CN); Zhi-Ren Zhong, Guangdong (CN); Wanquan Zhu, Guangdong (CN)

(73) Assignee: Wonderland Switzerland AG, Steinhausen (CH)

( * ) Notice: Subject to any disclaimer, the term of this patent is extended or adjusted under 35 U.S.C. 154(b) by 672 days.

(21) Appl. No.: 14/298,978

(22) Filed: Jun. 9, 2014

(65) Prior Publication Data

US 2014/0369744 A1 Dec. 18, 2014

(30) Foreign Application Priority Data

Jun. 13, 2013 (CN) .......................... 2013 1 0233667

(51) Int. Cl.
*B60N 2/28* (2006.01)
*B62B 7/14* (2006.01)

(52) U.S. Cl.
CPC ................ *B60N 2/28* (2013.01); *B62B 7/142* (2013.01); *B62B 2205/20* (2013.01); *B62B 2205/22* (2013.01); *B62B 2205/24* (2013.01); *Y10T 403/591* (2015.01); *Y10T 403/593* (2015.01); *Y10T 403/599* (2015.01); *Y10T 403/602* (2015.01)

(58) Field of Classification Search
CPC .. B60N 2/28; B62B 7/14; B62B 7/142; B62B 2205/20; B62B 2205/22; B62B 2205/24; Y10T 403/59; Y10T 403/591; Y10T 403/593; Y10T 403/595; Y10T 403/598; Y10T 403/599; Y10T 403/602; Y10T 403/608
USPC ...... 403/321, 322.1, 322.3, 322.4, 324, 325, 403/327, 330
See application file for complete search history.

(56) References Cited

U.S. PATENT DOCUMENTS 5,718,439 A * 2/1998 Wang ...................... B62B 7/142
  280/47.38
5,820,144 A * 10/1998 Wang ...................... B62B 7/142
  280/47.38
2008/0303232 A1 12/2008 Chen
(Continued)

FOREIGN PATENT DOCUMENTS

CN 1681684 A 10/2005
CN 102530047 A 7/2012
(Continued)

*Primary Examiner* — Josh Skroupa
(74) *Attorney, Agent, or Firm* — Winston Hsu

(57) ABSTRACT

A connection mechanism is used for detachably installing a carrier device to a supporting device. The connection mechanism includes a first base, fixed on the supporting device, a second base, fixed on the carrier device and detachably connected to the first base, a latch, movably disposed on the second base and corresponding to the first base, and an operating component, disposed on the second base and operably connected to the latch. The operating component selectively drives the latch to move to a locking position so that the second base is locked to the first base, or drives the latch to move to an unlocking position so that the second base is unlocked from the first base.

17 Claims, 19 Drawing Sheets

(56) References Cited

U.S. PATENT DOCUMENTS

| | | | |
|---|---|---|---|
| 2010/0244408 A1 | 9/2010 | Dean | |
| 2010/0327561 A1* | 12/2010 | Zhong | ................... B62B 7/145 280/648 |
| 2011/0278810 A1 | 11/2011 | Winterhalter | |
| 2012/0267925 A1 | 10/2012 | Hei | |
| 2013/0075992 A1* | 3/2013 | Zhu | ..................... B62B 7/142 280/47.38 |

FOREIGN PATENT DOCUMENTS

| | | | |
|---|---|---|---|
| CN | 202294915 U | 7/2012 | |
| CN | 202345738 U | 7/2012 | |
| CN | 102616266 A | 8/2012 | |
| DE | 19914528 A1 * | 10/2000 | ............ B62B 7/142 |
| DE | 200 16 909 U1 | 3/2001 | |
| EP | 1 818 239 A1 | 8/2007 | |
| EP | 2 108 566 A1 | 10/2009 | |
| EP | 2567877 A2 * | 3/2013 | ............ B62B 7/142 |
| WO | 2010040644 A1 | 4/2010 | |

\* cited by examiner

CONNECTION MECHANISM

BACKGROUND OF THE INVENTION

1. Field of the Invention

The invention relates to a connection mechanism, especially relates to a connection mechanism being convenient to install and detach, firm to connect and safe in use.

2. Description of the Prior Art

An infant stroller is an infant carrier designed for people to carry infants conveniently. Various infant strollers are available on the market. Most strollers are designed in foldable structures. These strollers provide much convenience to users when going out with infants. However, the stroller is provided with a seat for sitting an infant thereon. The seat is fixed on the stroller frame and not detachable or adjustable. Hence, such design cannot satisfy customers' requirements. In addition, when an infant is deeply asleep, it is dangerous for the infant to sit on the seat. Furthermore, these seats are not so comfortable and cannot offer infants better sleeping conditions. Therefore, such seat design has a certain limitation. According to this, people also design some infant strollers having a crib for infants to sleep thereon. The above two kinds of infant strollers can be used cooperatively in different conditions for infants, but using several infant strollers is uneconomical and brings much loading to normal families.

In addition to the infant strollers, the above problems also appear on cribs, high chairs, infant safety seats and other infant carriers. For example, in a crib, its crib body is usually fixedly connected to its frame, so the crib body cannot be detached alone when the crib body needs to be replaced. In an infant safety seat, its main body is fixedly connected to its base, so the main body and the base cannot be departed conveniently when the infant safety seat is required to be used forward or backward, leading to much inconvenience in daily use.

For solving the above problems, we may design the carrier and the frame in the cribs, high chairs and infant safety seats in a detachable form, so that we may form different infant strollers by replacing different carriers onto the frame. Such design needs a detachable connection mechanism. However, the installation and detachment of current connection mechanism is much troublesome; the connection thereof is unreliable and infirm.

SUMMARY OF THE INVENTION

An objective of the invention is to provide a connection mechanism which provides convenient installation and detachment and firm connection and is reliable and safe in use.

For achievement of the above purposes, the connection mechanism of the invention is used for detachably installing a carrier device to a supporting device. The connection mechanism includes a first base, a second base, a latch, and an operating component. The first base is fixed on the supporting device. The second base is fixed on the carrier device and detachably connected to the first base. The latch is movably disposed on the second base and corresponds to the first base. The operating component is disposed on the second base and operably connected to the latch. The operating component selectively drives the latch to move to a locking position so that the second base is locked to the first base, or drives the latch to move to an unlocking position so that the second base is unlocked from the first base.

Preferably, the first base includes a first base body and a blocking part. The first base body has a recess. The blocking part is formed on an inner side wall of the recess. The second base includes a second base body and a protrusive block. The protrusive block is formed on the second base body and detachably accommodated in the recess. Therein, when the protrusive block is accommodated in the recess, a bottom surface of the protrusive block abuts against an inner bottom wall of the recess, and the operating component drives the latch to move to the locking position so that the latch abuts against the blocking part leading to the second base being locked to the first base.

Specifically, the second base is installed to the first base in an installation direction. The latch has a guiding portion corresponding to the blocking part in the installation direction.

Specifically, the guiding portion shrinks gradually in a direction toward the locking position.

Preferably, the operating component includes a first operating part. The first operating part is movably disposed on a first portion of the second base and connected to the latch. The first operating part selectively drives the latch to move to the locking position or drives the latch to move to the unlocking position.

Specifically, a movement direction of the first operating part crosses with a movement direction of the latch.

Further specifically, the movement direction of the first operating part is perpendicular to the movement direction of the latch.

Further specifically, the first operating part has a first inclined surface. The first inclined surface is driven to abut against the latch so that the movement direction of the first operating part crosses with the movement direction of the latch.

Further specifically, the first operating part includes a first operating body. The first operating body has a first slanted slot thereon forming the first inclined surface. The latch includes a latch body and a pin body. The pin body is connected to the latch body, movably accommodated in the first slanted slot, and driven to abut against the first inclined surface.

Specifically, a movement direction of the first operating part is parallel to a movement direction of the latch.

Further specifically, the first operating part includes a first operating body. The first operating body has a first long slot. The second base includes a rod body. The rod body is accommodated in the first long slot so that the first operating part is capable of moving on the second base. Therein, the movement direction of the first operating part and the movement direction of the latch are parallel to an extension direction of the first long slot.

Specifically, the operating component further includes a first elastic part. The first elastic part elastically abuts against and between the second base and the first operating part so that the first operating part has a tendency to drive the latch to move to the locking position.

Specifically, the operating component further includes a second elastic part. The second elastic part elastically abuts against and between the second base and the latch so that the latch has a tendency to move to the locking position.

Specifically, the operating component further includes a second operating part and a transmission part. The second operating part is movably disposed on a second portion of the second base. The second portion is far away from the first portion. The transmission part is connected between the first operating part and the second operating part. Therein, the second operating part moves to drive the first operating part through the transmission part.

Specifically, the second operating part includes a pivot connection portion and a driving portion. The pivot connection portion is pivotally connected to the second base. The driving portion is connected to the pivot connection portion and has a second inclined surface. The transmission part includes a driven portion and a transmission portion. The driven portion is slidably disposed on the second base and driven to abut against the second inclined surface. The transmission portion is connected between the first operating part and the driven portion. Therein, the pivot connection portion pivots to drive the driving portion to pivot so that the second inclined surface abuts against the driven portion to drive the first operating part through the transmission portion.

Further specifically, a sliding direction of the driven portion crosses with an extension direction of the second inclined surface.

Further specifically, the sliding direction of the driven portion slants to the extension direction of the second inclined surface.

Further specifically, the driving portion has a second slanted slot thereon forming the second inclined surface. The driven portion is a rod part which is movably accommodated in the second slanted slot and driven to abut against the second inclined surface.

Further specifically, the operating component further includes a third elastic part. The third elastic part elastically abuts against between the second base and the second operating part so that the second operating part has a tendency to move back to an initial status driving the first operating part.

The invention disposes the first base and the second base. The latch can be driven to move to the locking position or the unlocking position by detachably connecting the first base with the second base and by the operating component to drive the latch. Therein, the movement direction of the latch is perpendicular to the sliding direction of the second base relative to the first base. Thereby, when the latch is located at the locking position, the purpose of locking the second base with the first base can be achieved; when the latch is located at the unlocking position, the purpose of unlocking the second base from the first base can be achieved. The whole connection through the connection mechanism is very firm. The connection mechanism is quite safe and reliable in use. When the second base is to be installed to or detached from the first base, just operating the latch through the operating component is required. Therefore, the control is simple; the installation and detachment is very convenient.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
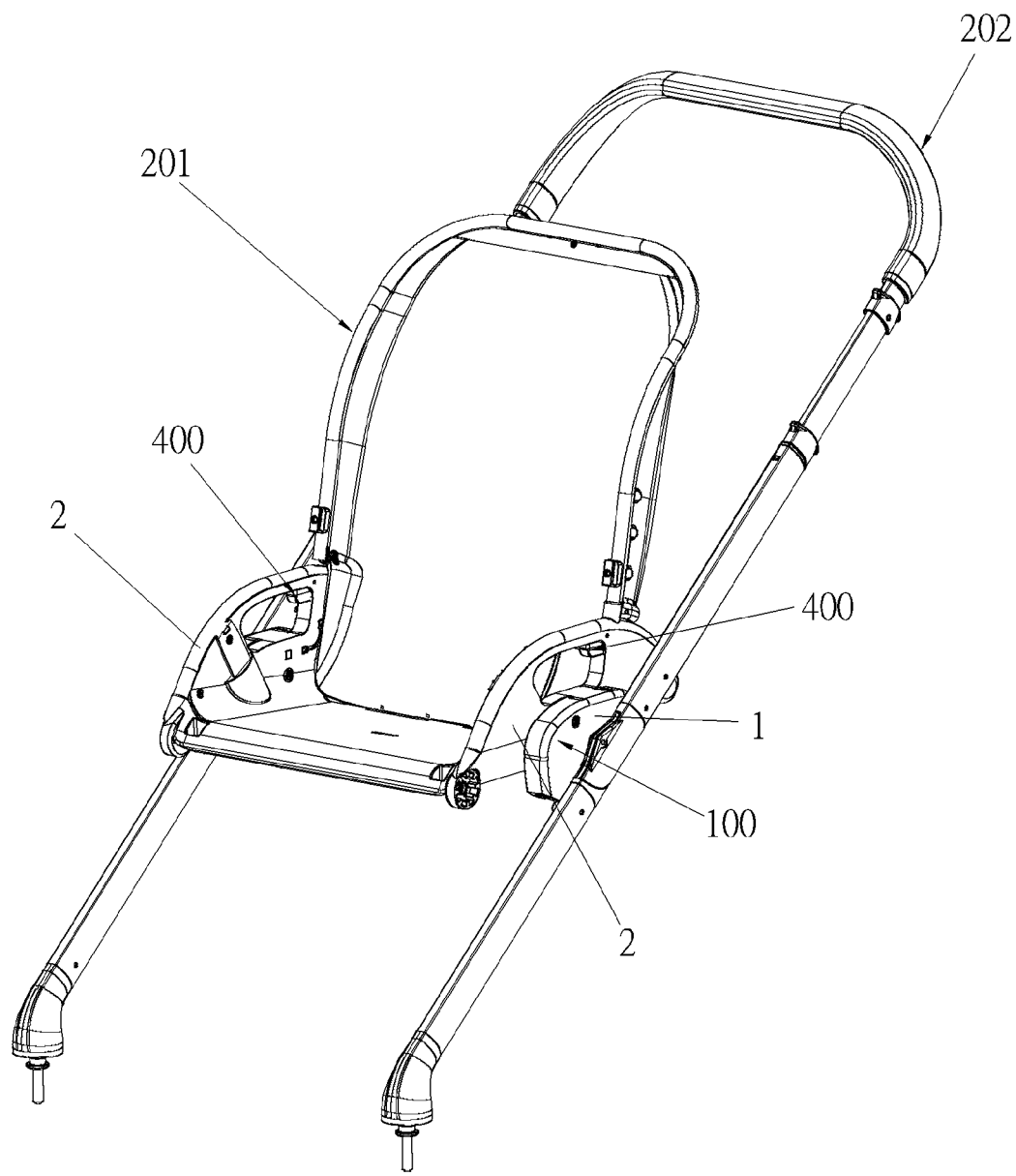
FIG. 1 is a perspective diagram illustrating an assembly of a carrier device forward installed to a supporting device through a connection mechanism of a first embodiment according to the invention.
Figure 2:
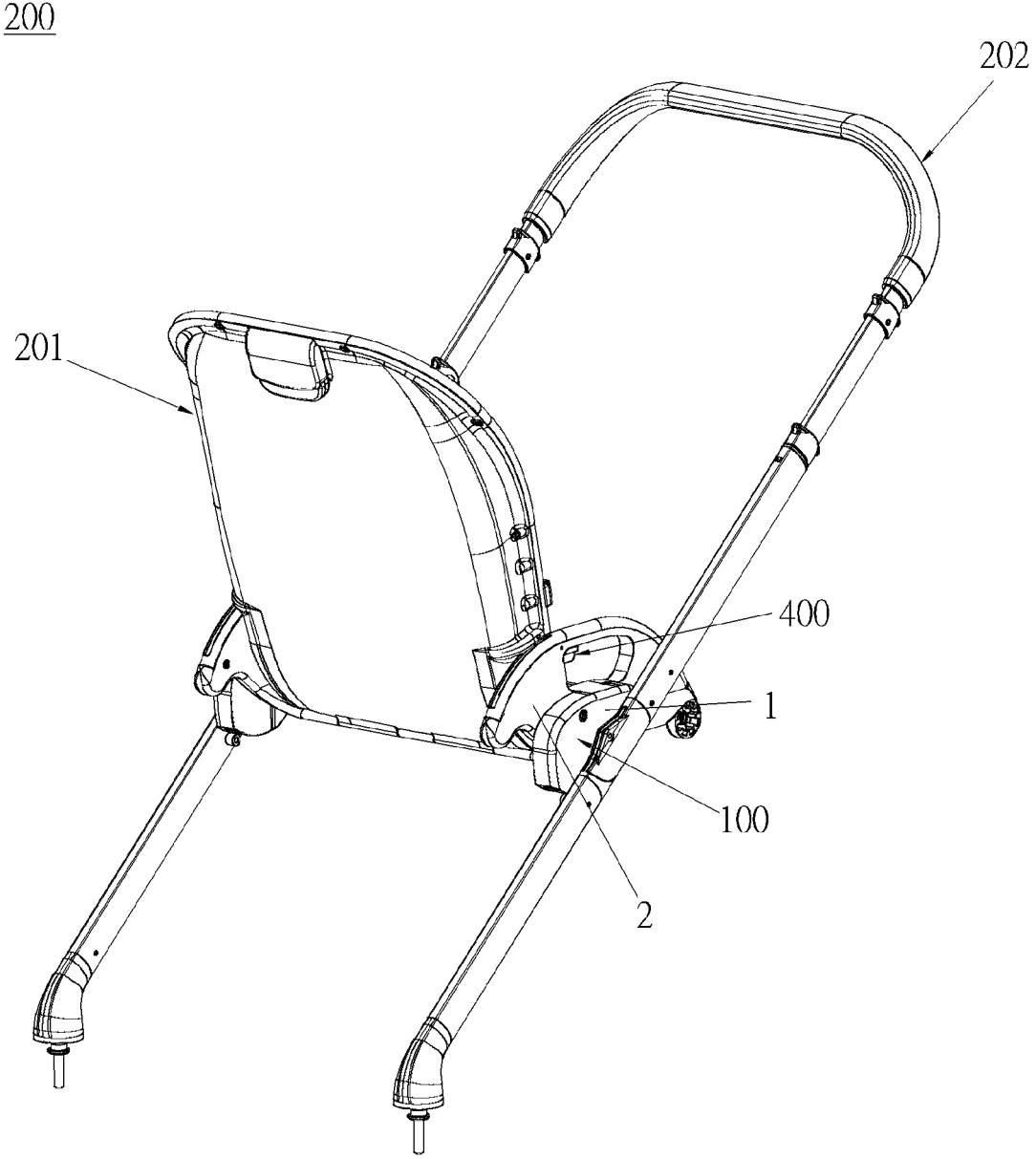
FIG. 2 is a perspective diagram illustrating an assembly of the carrier device backward installed to the supporting device through the connection mechanism of the first embodiment according to the invention.

A first embodiment according to the invention is described first of all, as shown by FIG. 1 and FIG. 2. FIG.

1 and FIG. 2 illustrate an infant care equipment 200 according to the invention. In the embodiment, for example, the infant care equipment 200 is an infant stroller but not limited thereto. The infant care equipment 200 includes a carrier device 201, a supporting device 202, and two connection mechanisms 100. The connection mechanism 100 is used for detachably installing the carrier device 201 to the supporting device 202. The connection mechanisms 100 are disposed symmetrically at two sides of each of the carrier device 201 and the supporting device 202. The carrier device 201 can be installed forwards or backwards on the supporting device 202. The connection mechanism 100 includes a first base 1, a second base 2, a latch 3, and an operating component 400. The first base 1 is fixed on the supporting device 202. The second base 2 is fixed on the carrier device 201 and detachably connected to the first base 1. The latch 3 is movably disposed on the second base 2 and corresponds to the first base 1. The operating component 400 is disposed on the second base 2 and operably connected to the latch 3. The operating component 400 selectively drives the latch 3 to move to a locking position so that the second base 2 is locked to the first base 1, or drives the latch 3 to move to an unlocking position so that the second base 2 is unlocked from the first base 1.

Figure 3:
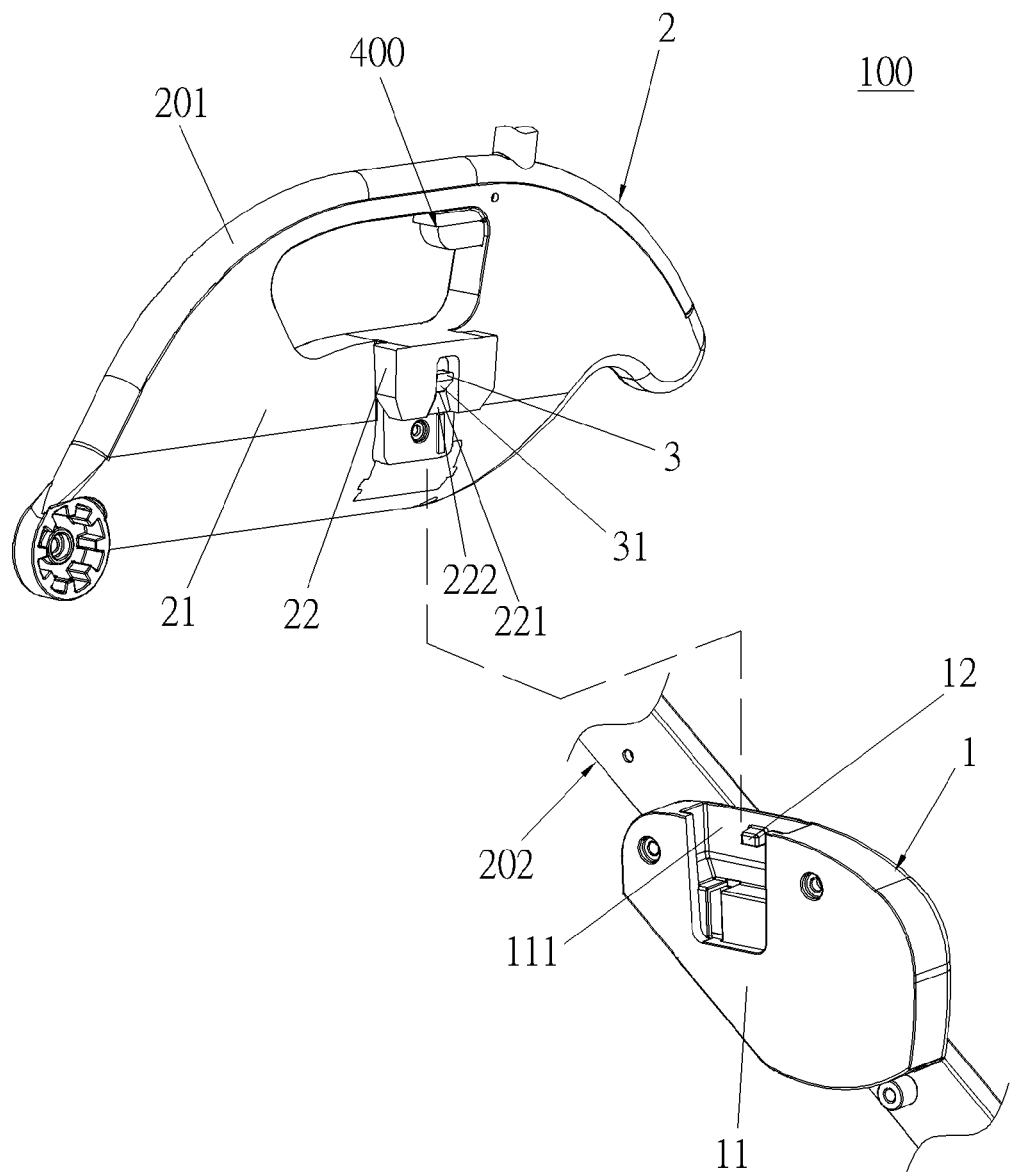
FIG. 3 is an exploded view of the connection mechanism for detaching the carrier device from the supporting device in the first embodiment according to the invention.

Please refer to FIG. 3. The connection mechanism 100 of the embodiment includes the first base 1, the second base 2, the latch 3, and the operating component 400. The first base 1 includes a first base body 11 and a blocking part 12. The first base body 11 has a recess 111. The blocking part 12 is formed on an inner side wall of the recess 111. The second base 2 includes a second base body 21 and a protrusive block 22. The protrusive block 22 is formed on the second base body 21 and detachably accommodated in the recess 111. By the cooperation of the protrusive block 22 with the recess 111, the first base 1 and the second base 2 can slide relatively only in a vertical direction, which is conducive to locking or unlocking of the first base 1 and the second base 2 by the operating component 400. The protrusive block 22 has a first sliding slot 221 and a second sliding slot 222. The latch 3 is slidably disposed in the first sliding slot 221. By the blocking part 12 sliding in the second sliding slot 222, the second base 2 is installed to the first base 1 in an installation direction. The latch 3 has a guiding portion 31 corresponding to the blocking part 12 in the installation direction. The guiding portion 31 shrinks gradually in a direction toward the locking position. Concretely, the bottom surface of the guiding portion 31 is an oblique surface. The second base 2 slides downward during the engagement of the second base 2 with the first base 1, so the disposition of the guiding portion 31 makes the latch 3 interact with the blocking part 12 during the locking of the latch 3, so that the latch 3 can automatically retract into the first sliding slot 221 during the downward sliding of the second base 2. Thereby, the protrusive block 22 of the second base 2 can be totally engaged in the recess 111 of the first base 1 smoothly. The structure is simple; the operating is convenient.

Figure 4:
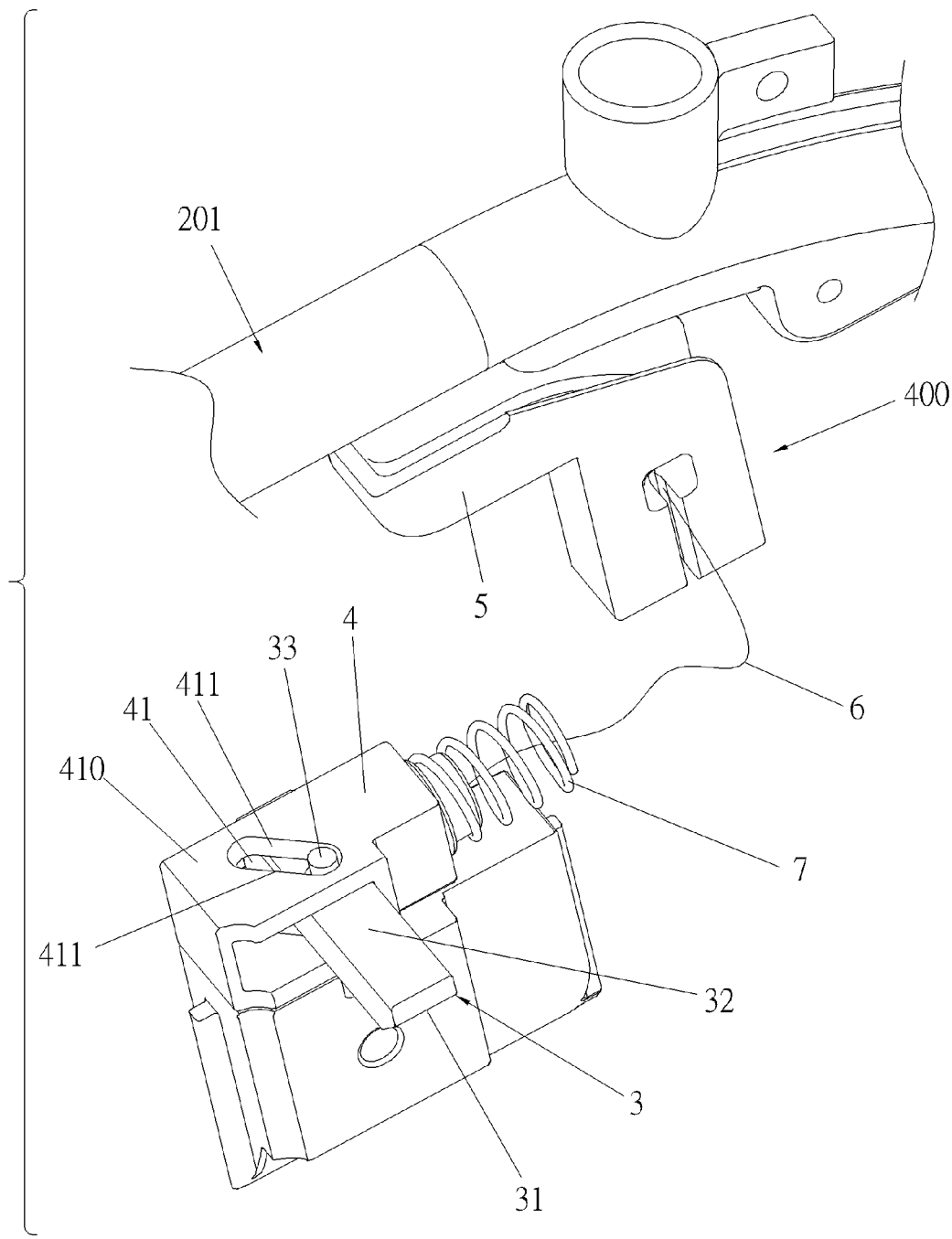
FIG. 4 is a perspective diagram illustrating an assembly of partial components of the connection mechanism which are disposed on the carrier device in the first embodiment according to the invention.
Figure 5:
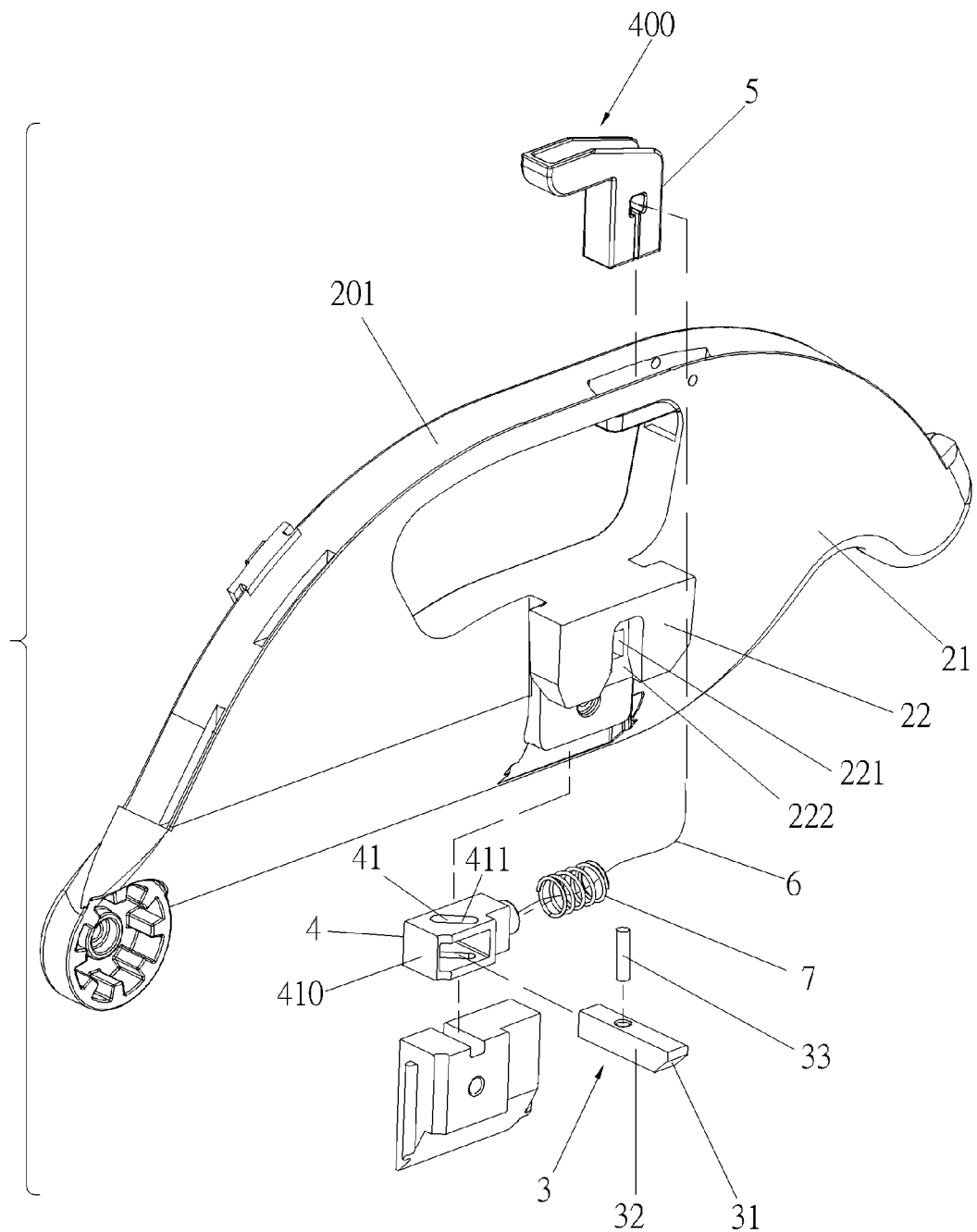
FIG. 5 is a perspective diagram illustrating an exploded view of the partial components of the connection mechanism which are disposed on the carrier device in the first embodiment according to the invention.
Figure 6:
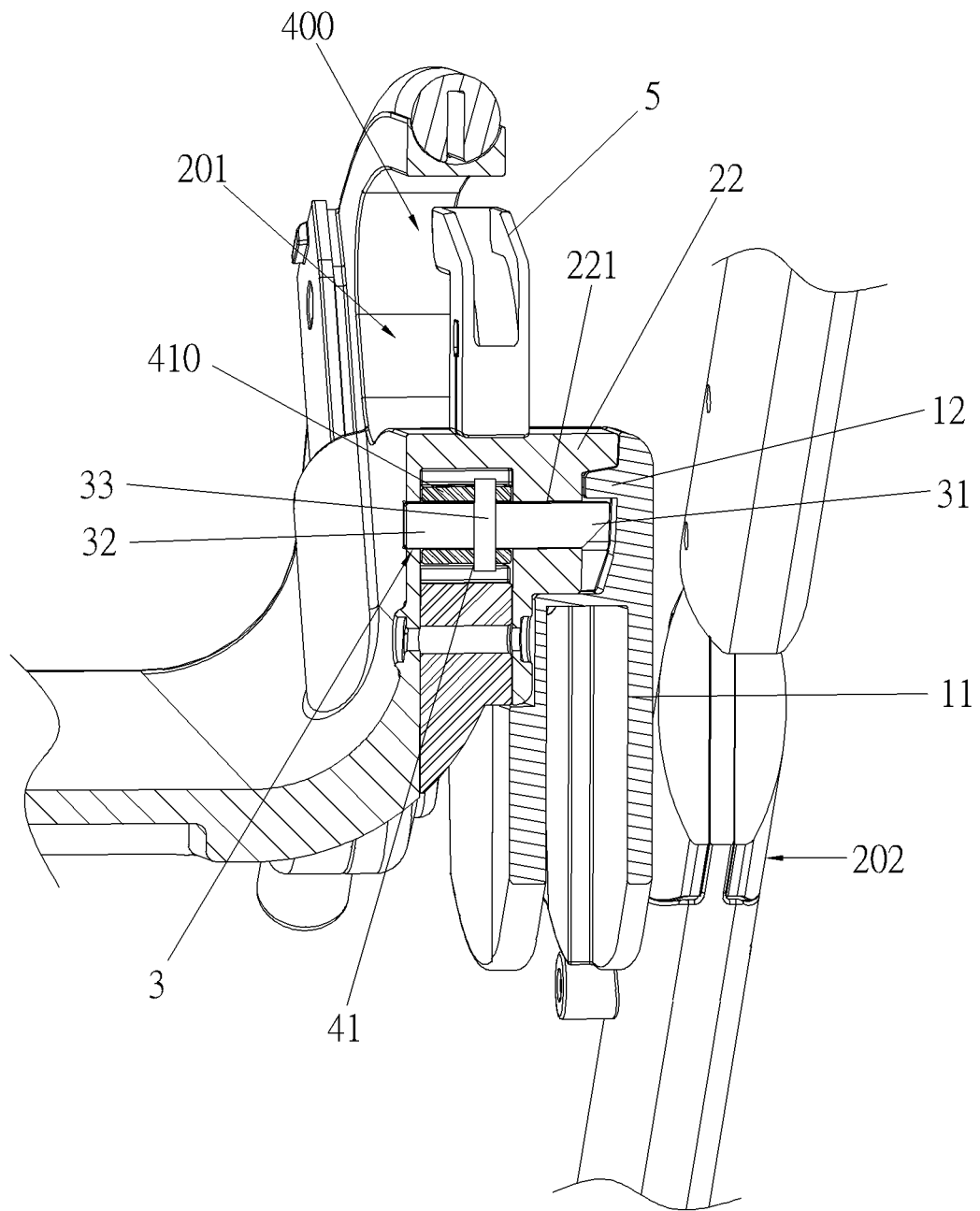
FIG. 6 is sectional diagram illustrating an assembly of the carrier device installed to the supporting device through the connection mechanism of the first embodiment according to the invention.

Please refer to FIGS. 4 through 6. The operating component 400 includes a first operating part 4, a second operating part 5, a transmission part 6, and a first elastic part 7. The first operating part 4 includes a first operating body 410. The first operating body 410 of the first operating part 4 is movably disposed on a first portion of the second base 2 and connected to the latch 3. The first operating body 410 of the first operating part 4 selectively drives the latch 3 to move to the locking position, or drives the latch 3 to move to the unlocking position. When in the locking position, the guiding portion 31 of the latch 3 protrudes outside the protrusive block 22 and abuts against the blocking part 12. When in the unlocking position, the guiding portion 31 of the latch 3 retracts in the protrusive block 22 and disengages from the blocking part 12. The first operating part 4 has a first slanted slot 41 having a first inclined surface 411; that is, the first operating body 410 of the first operating part 4 has the first slanted slot 41 having the first inclined surface 411. The extension direction of the first slanted slot 41 slants to the movement direction of the first operating part 4. Thereby, the first inclined surface 411 is driven to abut against the latch 3 so that the movement direction of the first operating body 410 of the first operating part 4 crosses with the movement direction of the latch 3. In the embodiment, the movement direction of the first operating part 4 is perpendicular to the movement direction of the latch 3. A longitudinal movement of the first operating part 4 can be transferred a transverse movement of the latch 3 through the first inclined surface 411, so that the latch 3 can move in the first sliding slot 221 back and forth. The latch 3 includes a latch body 32 and a pin body 33. The guiding portion 31 is formed at an outside end of the latch body 32. The pin body 33 is fixedly connected to the latch body 32, movably accommodated in the first slanted slot 41, and driven to abut against the first inclined surface 411. The pin body 33 performs the effect of connecting the latch body 32 with the first operating body 410 of the first operating part 4 and sliding in the first slanted slot 411, so that the pin body 33 cooperates with the first slanted slot 41 to limit the movement direction of the latch body 32. The first elastic part 7 elastically abuts against between the second base 2 and the first operating body 410 of the first operating part 4 so that the first operating part 4 has a tendency to drive the latch 3 to move to the locking position. The first elastic part 7 is a compression spring. The latch 3 can automatically move back to its original position by a resilient force provided by the first elastic part 7, so that the steps of the operating can be reduced and the installation and detachment of the connection mechanism is more convenient and quick. The second operating part 5 is movably disposed on a second portion of the second base 2. The second portion is far away from the first portion. The transmission part 6 is connected between the first operating body 410 of the first operating part 4 and the second operating part 5. The transmission part 6 is a steel wire in a tight state so as to transmit an external force applied to the second operating part 5 by a user; however, the invention is not limited thereto. Therein, the second operating part 5 moves and drives the first operating part 4 through the transmission part 6. Although the second portion is far away from the first portion, the user still can remotely manipulate the second operating part 5 to control the movement of the latch 3.

Please refer to FIGS. 3 through 6 together. When the latch 3 of the connection mechanism 100 of the embodiment is in the locking position, the protrusive block 22 is accommodated in the recess 111. The bottom surface of the protrusive block 22 abuts against the inner bottom wall of the recess 111. The first elastic part 7 abuts against the first operating part 4 so that the latch 3 reaches out and keeps located at the locking position where the latch 3 abuts against the blocking part 12. Accordingly, the second base 2 is locked to the first base 1, and the carrier device 202 is installed to the supporting device 201. If it is required to detach the carrier device 202 from the supporting device 201, the operating part 5 can be driven by hand pressing or by electric power so that the second operating part 5 drives the first operating part 4 through the transmission part 6, and the first operating part 4 moves horizontally. When moving horizontally, the first operating part 4 moves the latch 3 through the first inclined surface 411 so that the latch 3 retracts back and moves to the unlocking position. During the moving of the latch 3 to the unlocking position, the latch 3 also compresses the first elastic part 7. At the moment, the latch 3 is disengaged from the blocking part 12 so that the second base 2 is unlocked from the first base 1. If re-locking is required, the second operating part 5 is to be released so that the first elastic part 7 is restored to release elastic potential energy. Accordingly, the first elastic part 7 drives the latch 3 through the first operating part 4 so that the latch 3 abuts against the blocking part 12 leading to the second base 2 being locked to the first base 1.

In the first embodiment of the present invention, the first base 1 is detachably connected to the second base 2. The latch 3 can be driven to move to the locking position or the unlocking position by the operating component 400. Therein, the movement direction of the latch 3 is perpendicular to the sliding direction of the second base 2 relative to the first base 1. Thereby, when the latch 3 is located at the locking position, the purpose of locking the second base 2 with the first base 1 can be achieved; when the latch 3 is located at the unlocking position, the purpose of unlocking the second base 2 from the first base 1 can be achieved. The connection mechanism 100 is very firm, safe and reliable in use. The second base 2 can be installed to or detached from the first base 1 by operating the operating component 400. Therefore, the control is simple; the installation and detachment is very convenient.

Figure 7:
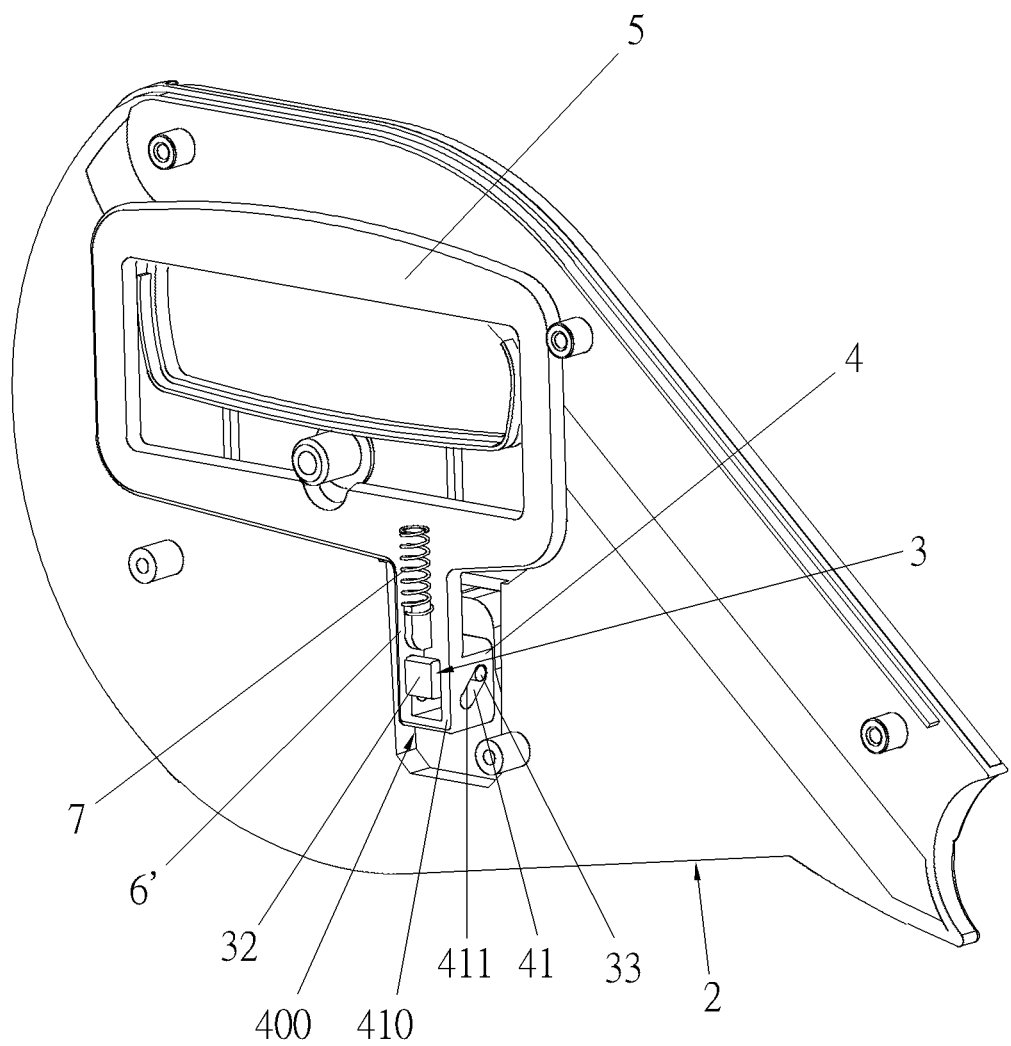
FIG. 7 is a perspective diagram illustrating an assembly of a carrier device for installing to a supporting device through a connection mechanism of a second embodiment according to the invention.
Figure 8:
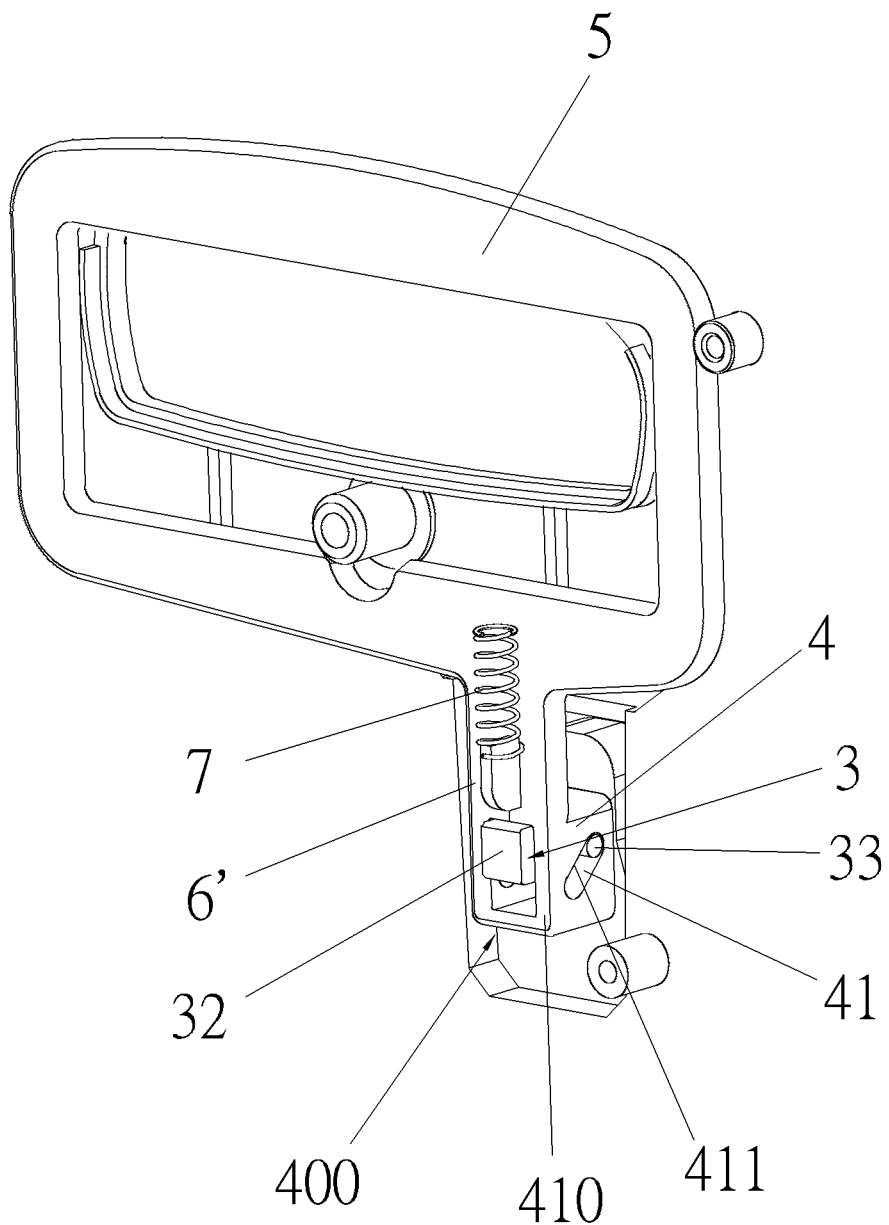
FIG. 8 is a perspective diagram illustrating an assembly of partial components of the connection mechanism of the second embodiment according to the invention.
Figure 9:
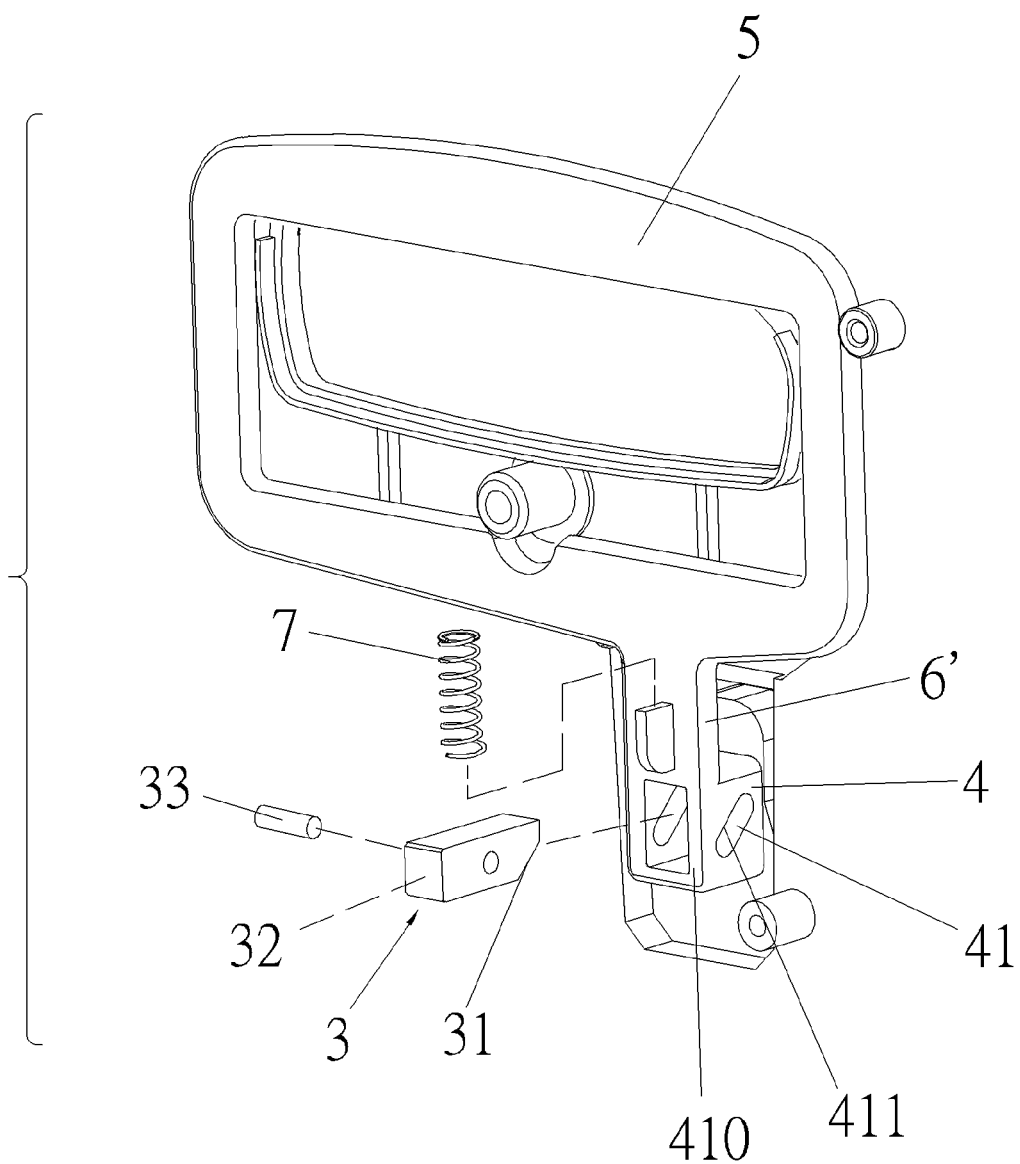
FIG. 9 is a perspective diagram illustrating an exploded view of the partial components of the connection mechanism of the second embodiment according to the invention.

The invention is not limited to the above embodiment and can also be applied to other embodiments. The following will describe a second embodiment according to the invention. As shown by FIGS. 7 through 9, the structure of the second embodiment is substantially similar to the first embodiment; similar component notations indicate similar components. One of differences between the two embodiments is the transmission part and the transmission mechanism thereof. A transmission part 6' of the second embodiment is but not limited to a plate or rod with a fixed shape. The transmission part 6' is fixedly connected to the first operating part 4 and the second operating part 5. The first elastic part 7 is disposed at a side of the transmission part 6'. One end of the first elastic part 7 abuts against the first operating part 4; the other end of the first elastic part 7 abuts against the second base 2. When the latch 3 is located at the locking position, the first elastic part 7 abuts against the transmission part 6' so that the first operating part 4 keeps the latch 3 located at the locking position. When unlocking is required, the second operating part 5 can be manipulated to move upward so that the transmission part 6' moves vertically to drive the first operating part 4 to move upward. The first operating part 4 drives the latch 3 to move toward the unlocking position and to compress the first elastic part 7. As in the unlocking position, the latch 3 is disengaged from the blocking part 12. When locking is required, the latch 3 has to be moved to the locking position again, the second operating part 5 can be released so that the first elastic part 7 releases elastic potential energy to make the latch 3 abut against the blocking part 12 leading to the second base 2 being locked on the first base 1.

The invention is not limited to the above embodiment and can also be applied to other embodiments. The following will describe a third embodiment according to the invention. Please refer to FIG. 10 and FIG. 11. The third embodiment is substantially similar in structure to the above embodiments; similar component notations indicate similar components. One of differences between the third embodiment and the above embodiments is the connection structure and the linkage mechanism of the operating component with the latch. A connection mechanism 100 of this embodiment includes a first base 1, a second base 2, a latch 3', and an operating component 400'. The first base 1 includes a first base body 11 and a blocking part 12. The first base body has a recess 111. The blocking part 12 is formed on an inner side wall of the recess 111. The second base 2 includes a second base body 21 and a protrusive block 22. The protrusive block 22 is formed on the second base body 21 and detachably accommodated in the recess 111. The protrusive block 22 has a first sliding slot 221 and a second sliding slot 222. The latch 3' is slidably disposed in the first sliding slot 221. The latch 3' includes a latch body 32'. A guiding portion 31 is formed at an outside end of the latch body 32'.

Figure 11:
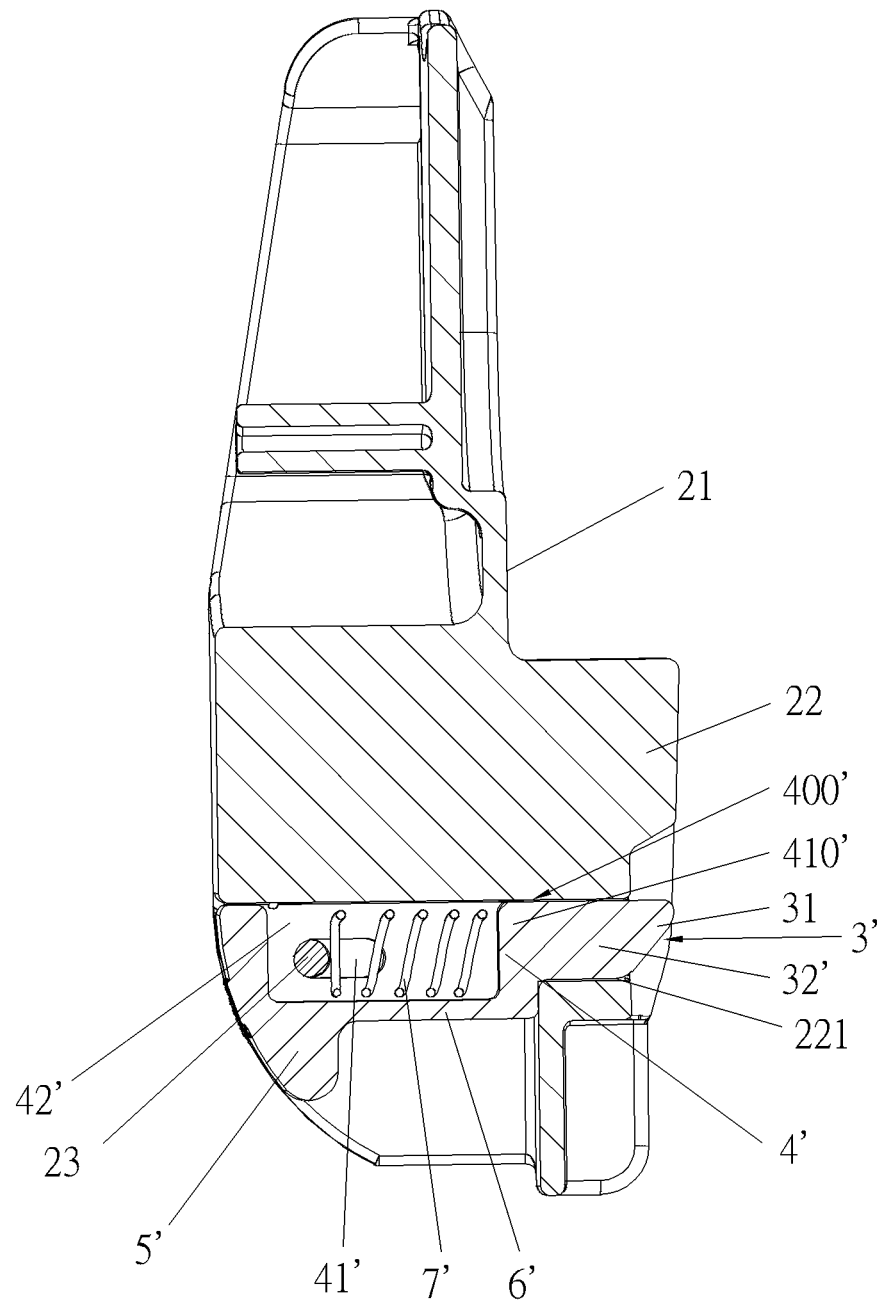
FIG. 11 is a sectional diagram illustrating partial components of the connection mechanism which are disposed on the carrier device in the third embodiment according to the invention.
Figure 12:
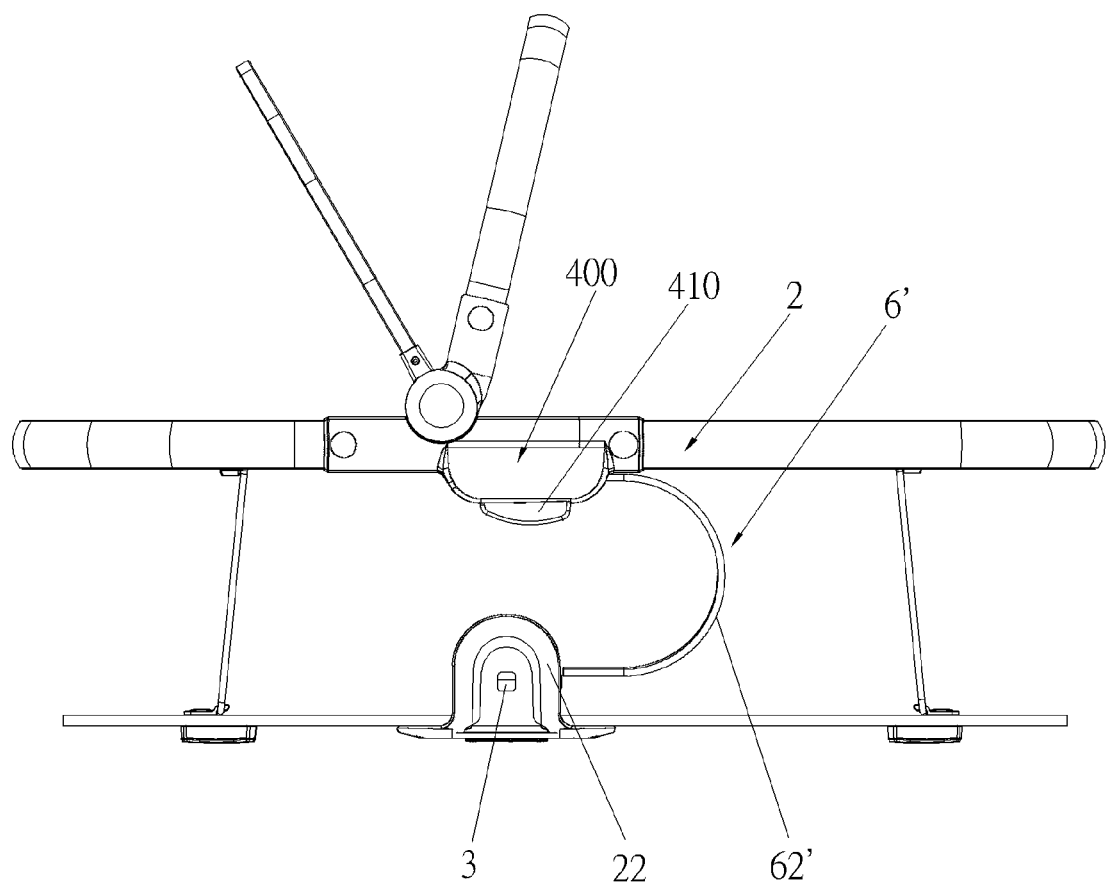
FIG. 12 is a side-view diagram illustrating partial components of a connection mechanism which are disposed on a carrier device in a fourth embodiment according to the invention.
Figure 13:
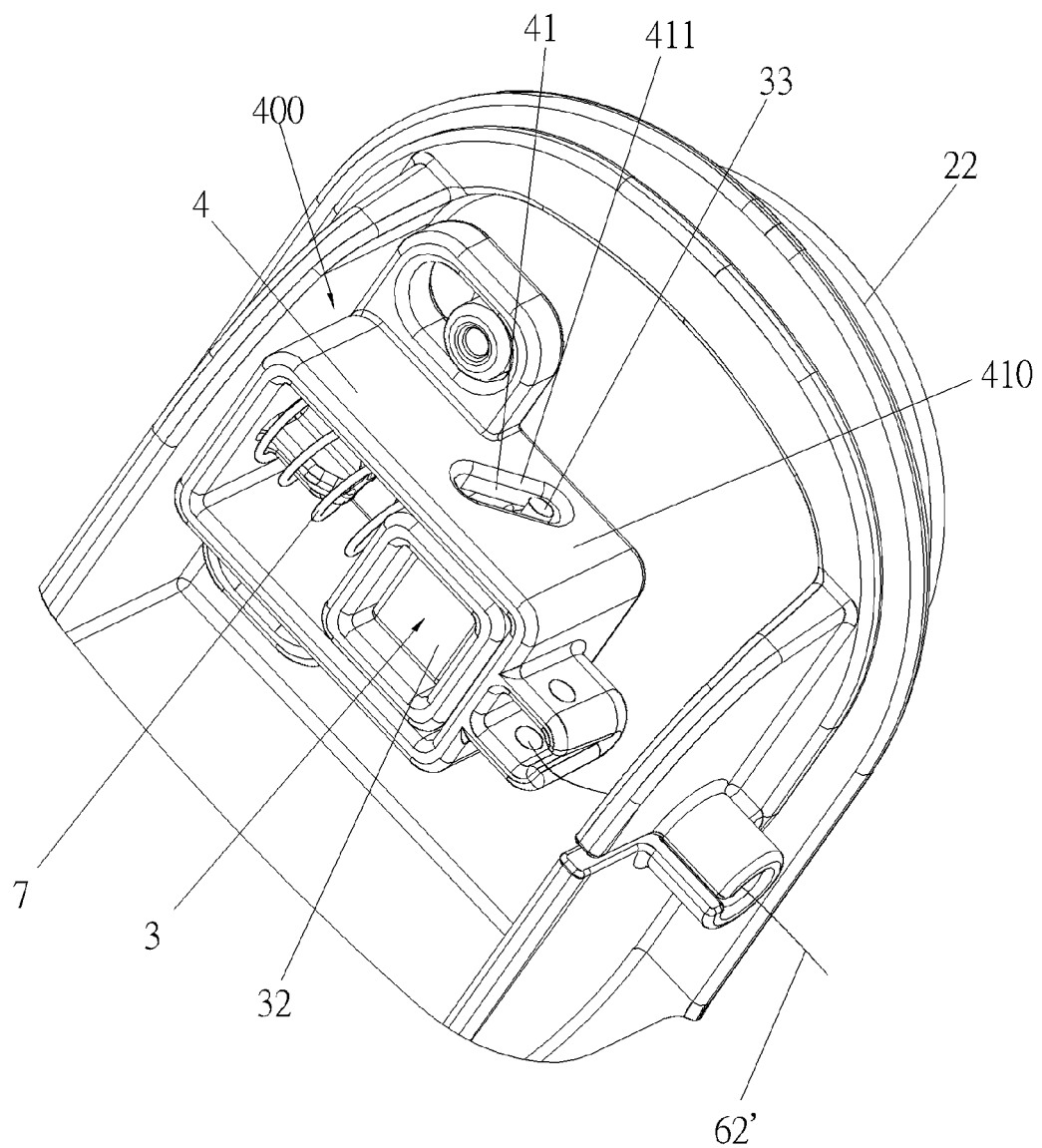
FIG. 13 is a perspective diagram illustrating an assembly of the partial components of the connection mechanism which are disposed on the carrier device in the fourth embodiment according to the invention.
Figure 14:
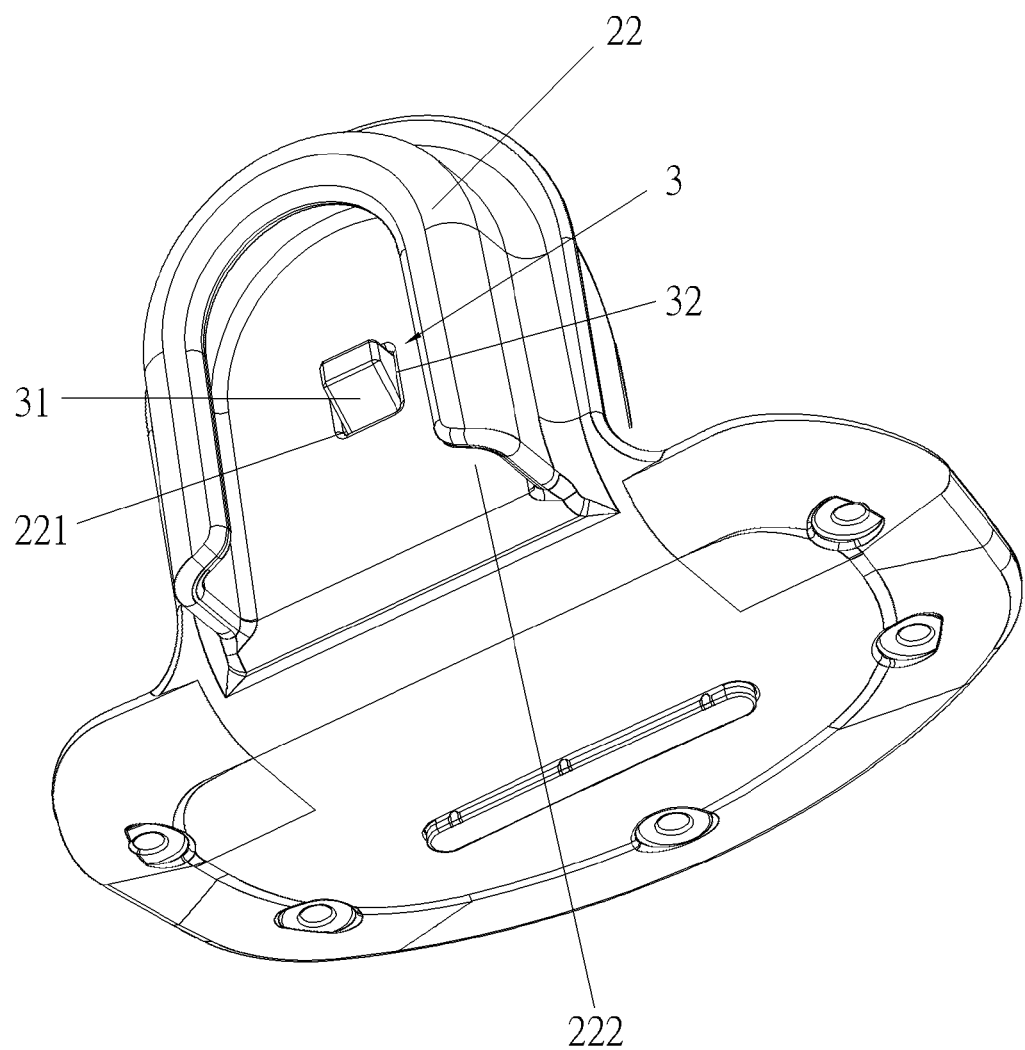
FIG. 14 is another perspective diagram illustrating the assembly of the partial components of the connection mechanism which are disposed on the carrier device in the fourth embodiment according to the invention.

Please refer to FIG. 11. The operating component 400' includes a first operating part 4', a second operating part 5', a transmission part 6', and a first elastic part 7'. In this embodiment, the first portion is a little far away from the second portion. The first operating part 4' includes a first operating body 410'. An end of a first operating body 410' is fixedly connected to an inside end of the latch body 32' of the latch 3', or the first operating body 410' and the latch 3' are formed integrally in one piece. The first operating body 410' has a first long slot 41' and an accommodating recess 42' accommodating the first elastic part 7'. The second base 2 further includes a rod body 23. The rod body 23 is inserted in the first long slot 41' so that the first operating part 4' can move on the second base 2. One end of the transmission part 6' is fixedly connected to another end of the first operating part 4', or the transmission part 6' and the first operating part 4' are formed integrally in one piece. The second operating part 5' is fixedly connected to the other end of the transmission part 6', or the second operating part 5' and the transmission part 6' are formed integrally in one piece. Substantially, the first operating part 4', the second operating part 5', the transmission part 6', and the latch 3' are formed integrally in one piece; however, the invention is not limited thereto. The movement direction of the first operating part 4', the second operating part 5', the transmission part 6', and the latch 3' is parallel to the extension direction of the first long slot 41'. The first elastic part 7' is disposed in the accommodating recess 42' and elastically abuts against and between the rod body 23 of the second base 2 and the first operating body 410' of the first operating part 4' , so that the first operating part 4' has a tendency to drive the latch 3' to move to the locking position. The first elastic part 7' is a compression spring.

Figure 10:
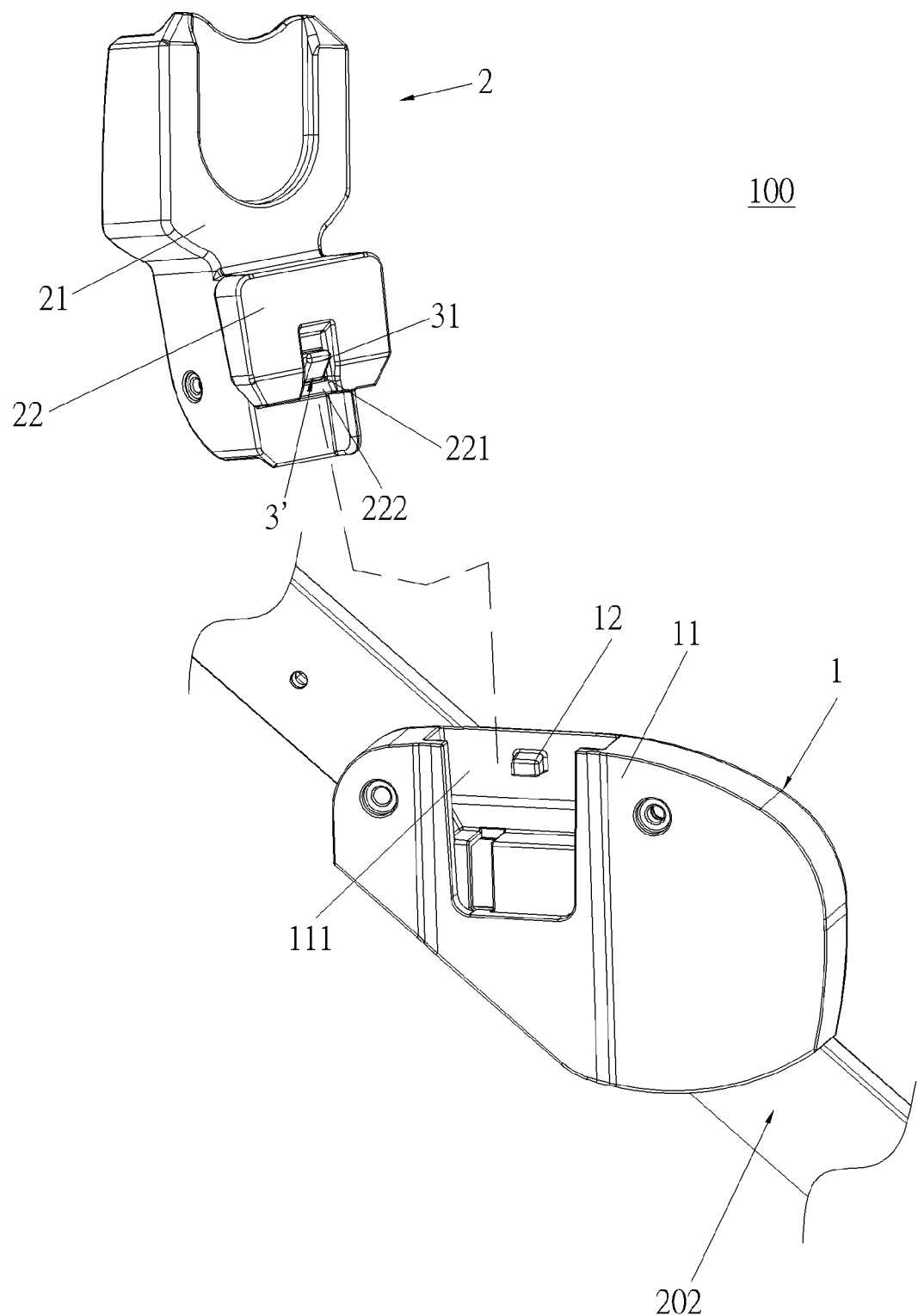
FIG. 10 is a perspective diagram illustrating an exploded view of a carrier device being detached from a supporting device through a connection mechanism of a third embodiment according to the invention.

Please refer to FIG. 10 and FIG. 11 together. If it is required to unlock the first base 1 and the second base 2, the second operating part 5' can be driven by hand drawing or by electric power so that the second operating part 5' moves the first operating part 4' through the transmission part 6' . The first operating part 4' moves and drives the latch 3' to move. The latch 3' retracts in the first sliding slot 221 and drives the first operating part 4' to compress the first elastic part 7' . At the moment, the latch 3' is disengaged from the blocking part 12 so that the second base 2 is unlocked from the first base 1. When re-locking is required, the second operating part 5' is to be released so that the first elastic part 7' is restored under the resilient force to move the first operating part 4' to drive the latch 3' to protrude out the first sliding slot 221 and abut against the blocking part 12. Accordingly, the second base 2 and the first base 1 are locked with each other.

The invention is not limited to the above embodiment and can also be applied to other embodiments. The following will describe a fourth embodiment according to the invention. The fourth embodiment is substantially similar in structure to the above embodiments; similar component notations indicate similar components. One of differences between the fourth embodiment and the above embodiments is the structure of the operating component and the linkage mechanism thereof . As shown by FIGS. 12 through 15, a connection mechanism 100 of this embodiment includes a first base 1, a second base 2, a latch 3, and an operating component 400. In the embodiment, for example, the second base 2 is but not limited to a crib box. The operating component 400 includes a first operating part 4, a second operating part 5', a transmission part 6', and a first elastic part 7.

Figure 15:
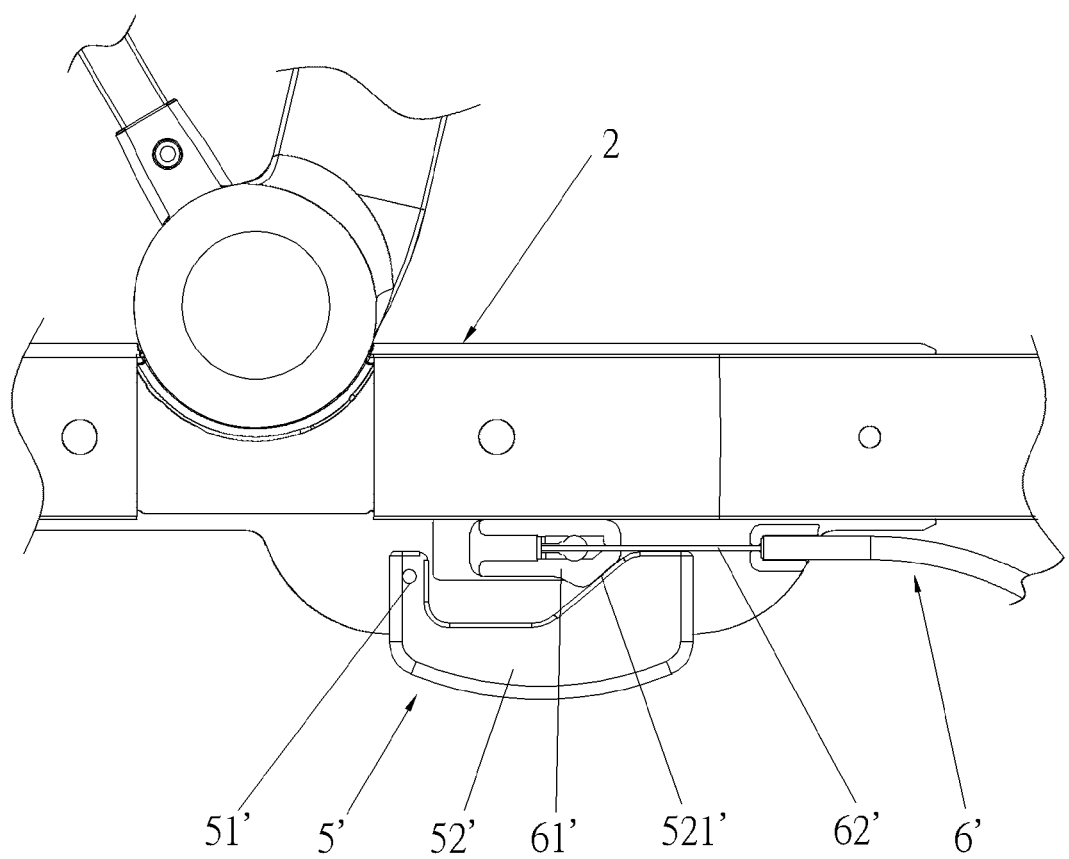
FIG. 15 is a sectional diagram illustrating the assembly of the partial components of the connection mechanism which are disposed on the carrier device in the fourth embodiment according to the invention.
Figure 16:
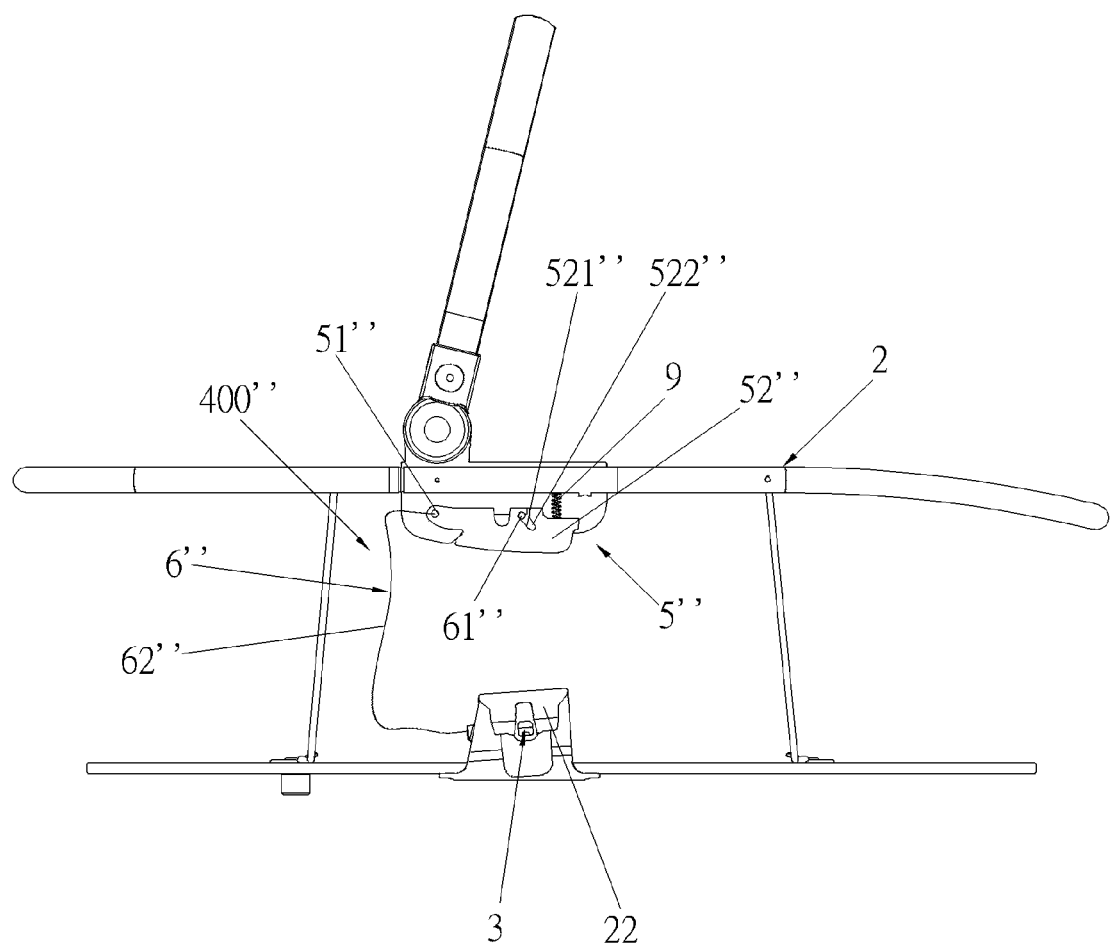
FIG. 16 is a sectional diagram illustrating the assembly of partial components of a connection mechanism which are disposed on a carrier device in a fifth embodiment according to the invention.
Figure 17:
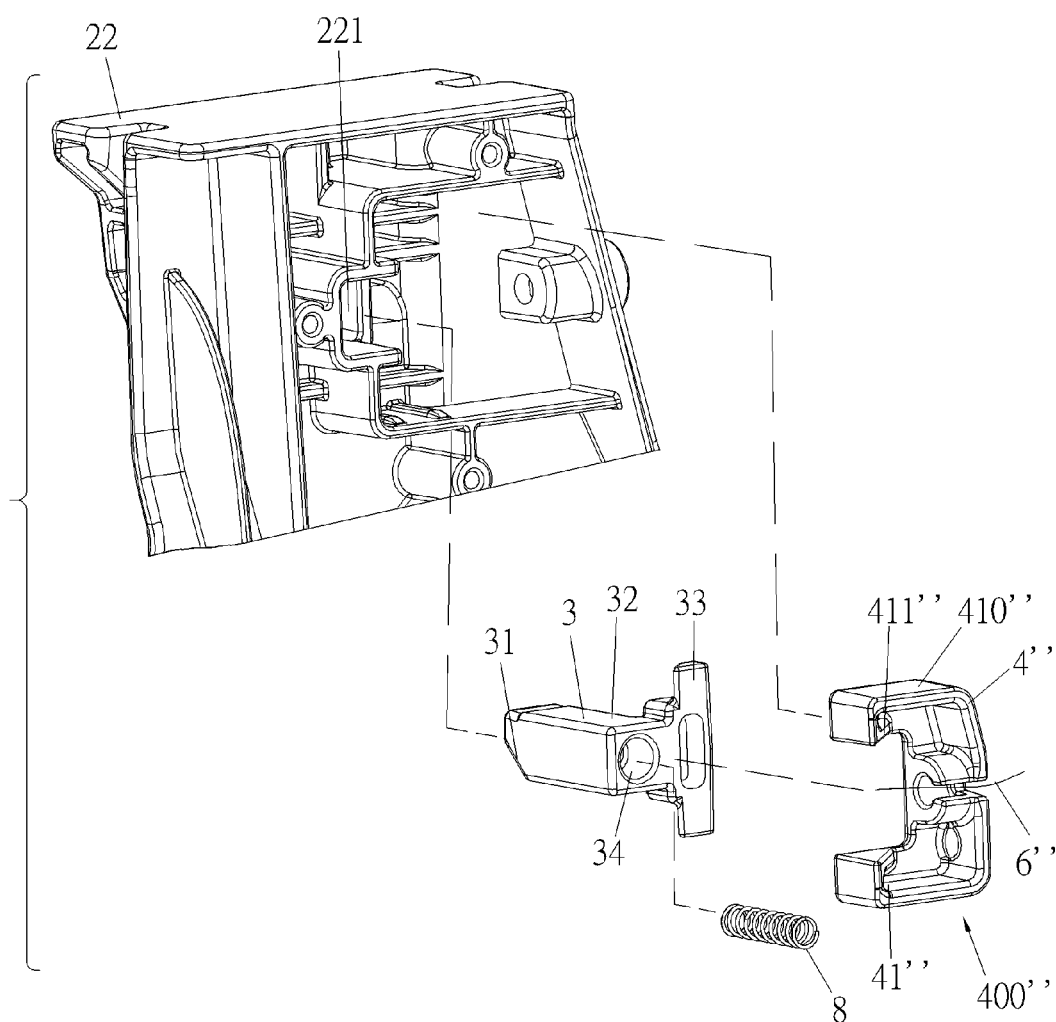
FIG. 17 is a perspective diagram illustrating an exploded view of the partial components of the connection mechanism which are disposed on the carrier device in the fifth embodiment according to the invention.
Figure 18:
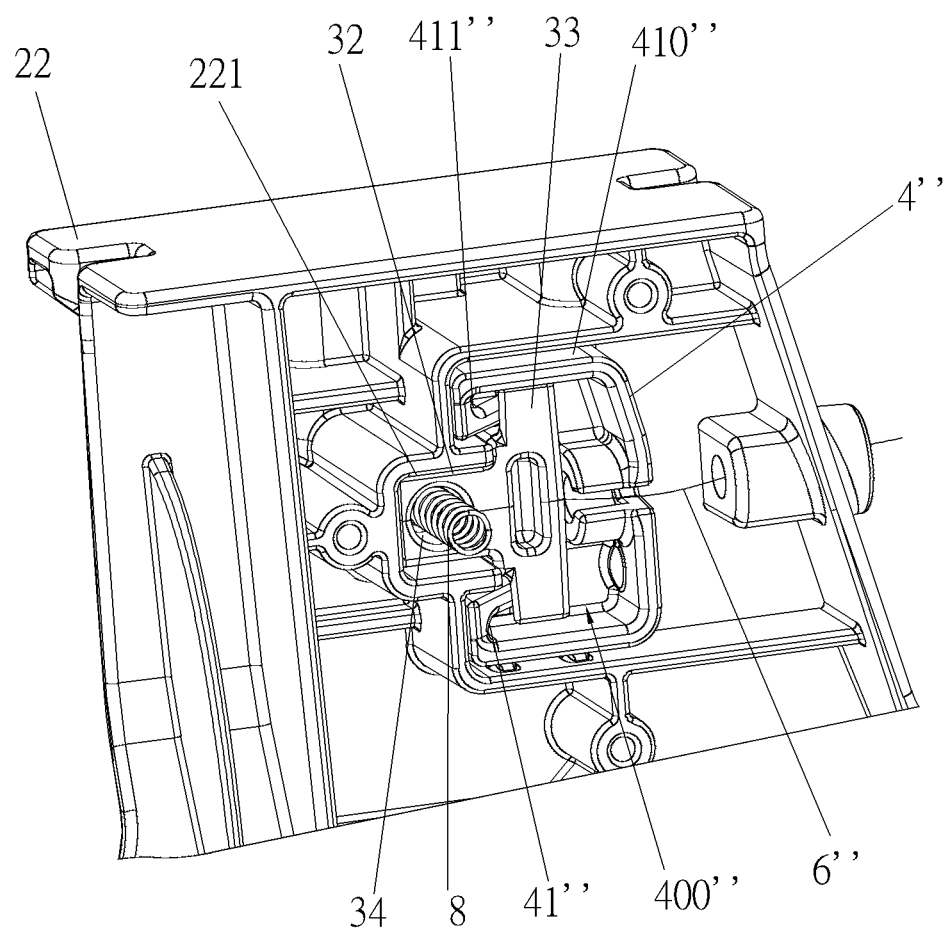
FIG. 18 is a perspective diagram illustrating an assembly of the partial components of the connection mechanism which are disposed on the carrier device in the fifth embodiment according to the invention.
Figure 19:
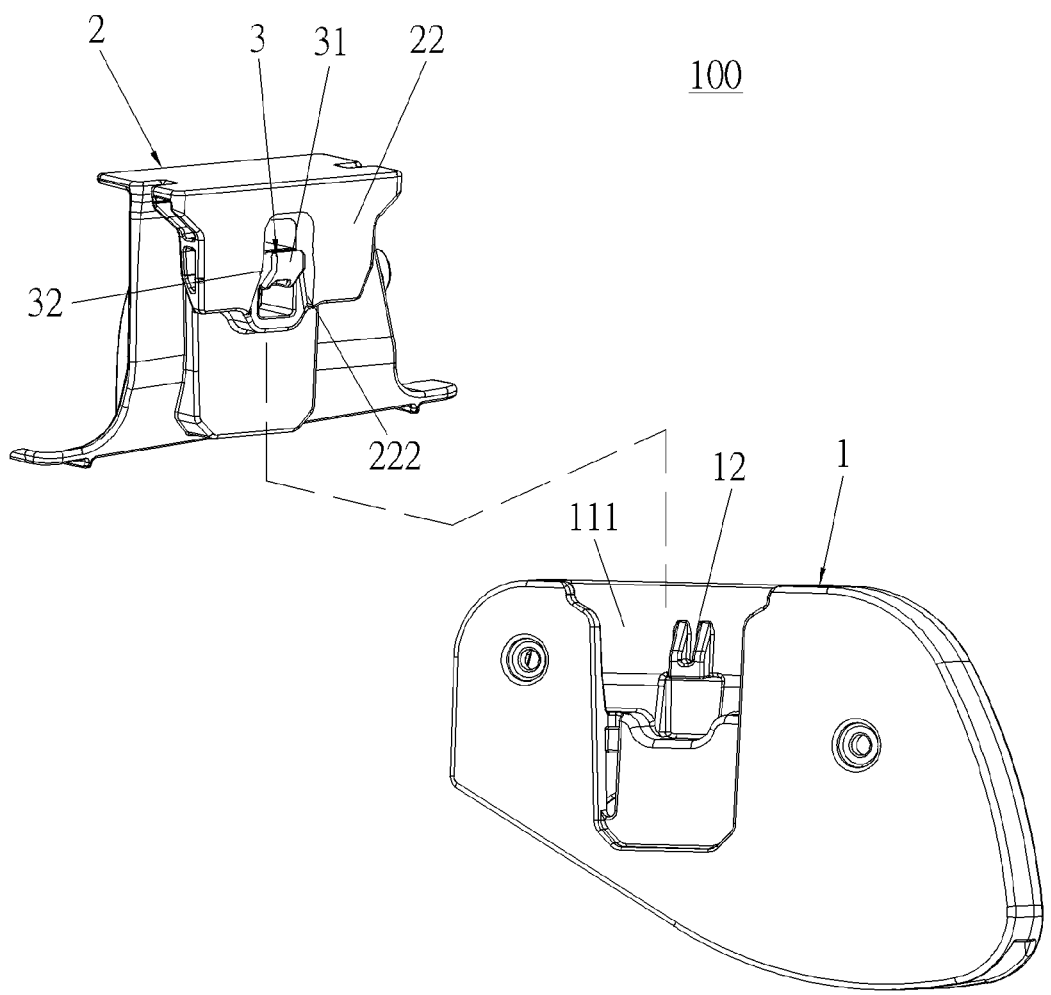
FIG. 19 is an exploded view of the connection mechanism for detaching the carrier device from a supporting device in the fifth embodiment according to the invention.

As shown by FIG. 15, the second operating part 5' includes a pivot connection portion 51' and a driving portion 52'. The pivot connection portion 51' is pivotally connected to the second base 2. The driving portion 52' is connected to the pivot connection portion 51' and has a second inclined surface 521'. The transmission part 6' includes a driven portion 61' and a transmission portion 62'. The driven portion 61' is slidably disposed on the second base 2 and driven to abut against the second inclined surface 521'. The sliding direction of the driven portion 61' crosses with the extension direction of the second inclined surface 521'. Specifically, the sliding direction of the driven portion 61' slants to the extension direction of the second inclined surface 521'. The transmission portion 62' is connected between the first operating body 410 of the first operating part 4 and the driven portion 61'. The transmission portion 62' is a steel wire. The pivot connection portion 51' pivots to drive the driving portion 52' so that the second inclined surface 521' abuts against the driven portion 61' to drive first operating part 4 through the transmission portion 62'.

Please refer to FIGS. 12 through 15 together. When it is required to unlock the first base 1 and the second base 2, the driving portion 52' can be driven by pressing so that the driving portion 52' rotates due to the pivotal connection of the pivot connection portion 51'. The second inclined surface 521' moves upward to push the driven portion 61' to move horizontally left on the second base 2. The driven portion 61' drives the first operating part 4 through the transmission portion 62' so that the first operating part 4 moves on the first base 1 . The first inclined surface 411 of the first slanted slot 41 of the first operating part 4 drives the pin body 33 of the latch 3 to move, so that the latch body 32 of the latch 3 is disengaged from the blocking part 12 and compresses the first elastic part 7. At the moment, the second base 2 is unlocked from the first base 1. When re-locking is required, the driving portion 52' is to be released so that the driven portion 61' is no longer confined by the second inclined surface 521' and capable of sliding horizontally right on the second base 2. At the moment, under the resilient force by the first elastic part 7, the first inclined surface 411 of the first slanted slot 41 abuts against the pin body 33 of the latch 3, so that the latch 3 moves and the latch body 32 of the latch 3 abuts against blocking part 12 leading to the second base 2 being locked to the first base 1.

The invention is not limited to the above embodiment and can also be applied to other embodiments. The following will describe a fifth embodiment according to the invention. The fifth embodiment is substantially similar in structure to the above embodiments; similar component notations indicate similar components. One of differences between the fifth embodiment and the above embodiments is the structure and the linkage mechanism of the operating component and the latch. Please refer to FIGS. 16 through 19. A connection mechanism 100 of this embodiment includes a first base 1, a second base 2, a latch 3, and an operating component 400". The operating component 400" includes a first operating part 4", a second operating part 5", a transmission part 6", a second elastic part 8, and a third elastic part 9. The first operating part 4" is movably disposed on a first portion of the second base 2 and connected to the latch 3. The first operating part 4" includes a first operating body 410". The first operating body 410" has a first slanted slot 41". The first slanted slot 41" has a first inclined surface 411" . In the embodiment, the first slanted slot 41" is structurally designed in an open type, but it can be designed in a semi-open type or a close type as the above embodiments. The movement direction of the first inclined surface 411" of the first slanted slot 41" of the first operating body 410" crosses with the movement direction of the latch 3. The second operating part 5" is movably disposed on a second portion of the second base 2. The transmission part 6" is connected between the first operating part 4" and the second operating part 5". Therein, the second operating part 5" moves and drives the first operating part 4" through the transmission part 6". The second elastic part 8 elastically abuts against and between the second base 2 and the latch body 32 of the latch 3 so that the latch body 32 of the latch 3 has a tendency to move to the locking position. Concretely, the latch body 32 of the latch 3 has a hole 34. The second elastic part 8 is accommodated in the hole 34. One end of the second elastic part 8 abuts against the latch body 32 of the latch 3; the other end of the second elastic part 8 abuts against the second base 2. The pin body 33 of the latch 3 cooperates with the first inclined surface 411" so that the first operating part 4" drives the latch 3 to move in the first sliding slot 221. In the embodiment, because the first slanted slot 41" is structurally designed in an open type, the whole pin body 33 can be accommodated in the first slanted slot 41". If the first slanted slot 41" is designed in a semi-open type or a close type as the above embodiments, the pin body 33 is partially inserted into the first slanted slot 41".

Please refer to FIG. 16 again. The second operating part 5" includes a pivot connection portion 51" and a driving portion 52". The pivot connection portion 51" is pivotally connected to the second base 2. The driving portion 52" is connected to the pivot connection portion 51" and has a second inclined surface 521". Concretely, the driving portion 52" has a second slanted slot 522" having the second inclined surface 521". The transmission part 6" includes a driven portion 61" and a transmission portion 62". The driven portion 61" is slidably disposed on the second base 2, inserted in the second slanted slot 522", and driven to abut against the second inclined surface 521" . In the embodiment, the driven portion 61" is a rod part. The transmission portion 62" is connected between the first operating body 410" of the first operating part 4" and the driven portion 61". In the embodiment, the transmission portion 62" is a steel wire. The sliding direction of the driven portion 62" crosses with the extension direction of the second inclined surface 521". Concretely, the sliding direction of the driven portion 61" slants to the extension direction of the second inclined surface 521". The third elastic part 9 elastically abuts against between the second base 2 and the driving portion 52" of the second operating part 5" so that the second operating part 5" has a has a tendency to move back to an initial status driving the first operating part 4". Concretely, one end of the third elastic part 9 abuts against the second base 2; the other end of the third elastic part 9 abuts against the driving portion 52".

Please refer to FIGS. 16 through 19 together. If it is required to unlock the second base 2 and the first base 1, the driving portion 52" can be driven by pressing so that the driving portion 52" rotates due to the pivotal connection of the pivot connection portion 51". The second inclined surface 521" moves upward to push the driven portion 61" to horizontally move right in the second slanted slot 522". At the moment, the driven portion 61" moves right in the horizontal direction. During the movement of the driven portion 61", the driven portion 61" drives the first operating body 410" of the first operating part 4" through the transmission portion 62" so that the first operating body 410" moves on the first base 1. The first inclined surface 411" of the first slanted slot 41" of the first operating body 410" of the first operating part 4" drives the pin body 33 of the latch 3 to move so that the latch body 32 of the latch 3 is disengaged from the blocking part 12 and compresses the second elastic part 8. At the moment, the second base 2 is unlocked from the first base 1. When re-locking is required, the driving portion 52" is to be released so that the latch body 32 of the latch 3 abuts against the blocking part 12 under the resilient force by the second elastic part 8 leading to the second base 2 being locked to the first base 1.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A connection mechanism for detachably installing a carrier device to a supporting device, the connection mechanism comprising:
   a first base fixed on the supporting device;
   a second base fixed on the carrier device and detachably connected to the first base;
   a latch movably disposed on the second base, the latch corresponding to the first base; and
   an operating component disposed on the second base and operably connected to the latch, the operating component selectively driving the latch to move to a locking position so that the second base is locked to the first base, or driving the latch to move to an unlocking position so that the second base is unlocked from the first base, wherein the operating component comprises a first operating part, a second operating part, and a transmission part, the first operating part is movably disposed on a first portion of the second base and connected to the latch, the first operating part selectively drives the latch to move to the locking position or drives the latch to move to the unlocking position, the second operating part is movably disposed on a second portion of the second base, the second portion is away from the first portion, the transmission part is connected between the first operating part and the second operating part, and the second operating part moves to drive the first operating part through the transmission part.

2. The connection mechanism of claim 1, wherein the first base comprises a first base body and a blocking part, the first base body has a recess, the blocking part is formed on an inner side wall of the recess, the second base comprises a second base body and a protrusive block, the protrusive block is formed on the second base body and detachably accommodated in the recess, and when the protrusive block is accommodated in the recess, a bottom surface of the protrusive block abuts against an inner bottom wall of the recess, and the operating component drives the latch to move to the locking position so that the latch abuts against the blocking part leading to the second base being locked to the first base.

3. The connection mechanism of claim 2, wherein the second base is installed to the first base in an installation direction, and the latch has a guiding portion corresponding to the blocking part in the installation direction.

4. The connection mechanism of claim 3, wherein the guiding portion shrinks gradually in a direction toward the locking position.

5. The connection mechanism of claim 1, wherein a movement direction of the first operating part crosses with a movement direction of the latch.

6. The connection mechanism of claim 5, wherein the movement direction of the first operating part is perpendicular to the movement direction of the latch.

7. The connection mechanism of claim 5, wherein the first operating part has a first inclined surface driven to abut against the latch so that the movement direction of the first operating part crosses with the movement direction of the latch.

8. The connection mechanism of claim 7, wherein the first operating part comprises a first operating body having a first slanted slot thereon forming the first inclined surface, the latch comprises a latch body and a pin body, and the pin body is connected to the latch body, movably accommodated in the first slanted slot, and driven to abut against the first inclined surface.

9. The connection mechanism of claim 1, wherein a movement direction of the first operating part is parallel to a movement direction of the latch.

10. The connection mechanism of claim 9, wherein the first operating part comprises a first operating body having a first long slot, the second base comprises a rod body accommodated in the first long slot so that the first operating part is capable of moving on the second base, and the movement direction of the first operating part and the movement direction of the latch are parallel to an extension direction of the first long slot.

11. The connection mechanism of claim 1, wherein the operating component comprises a first elastic part elastically abutting against between the second base and the first operating part so that the first operating part has a tendency to drive the latch to move to the locking position.

12. The connection mechanism of claim 1, wherein the operating component comprises a second elastic part elastically abutting against between the second base and the latch so that the latch has a tendency to move to the locking position.

13. The connection mechanism of claim 1, wherein the second operating part comprises a pivot connection portion and a driving portion, the pivot connection portion is pivotally connected to the second base, the driving portion is connected to the pivot connection portion and has a second inclined surface, the transmission part comprises a driven portion and a transmission portion, the driven portion is slidably disposed on the second base and driven to abut against the second inclined surface, the transmission portion is connected between the first operating part and the driven portion, and the pivot connection portion pivots to drive the driving portion to pivot so that the second inclined surface abuts against the driven portion to drive the first operating part through the transmission portion.

14. The connection mechanism of claim 13, wherein a sliding direction of the driven portion crosses with an extension direction of the second inclined surface.

15. The connection mechanism of claim 14, wherein the sliding direction of the driven portion slants to the extension direction of the second inclined surface.

16. The connection mechanism of claim 13, wherein the driving portion has a second slanted slot thereon forming the second inclined surface, and the driven portion is a rod part which is movably accommodated in the second slanted slot and driven to abut against the second inclined surface.

17. The connection mechanism of claim 1, wherein the operating component comprises a third elastic part elastically abutting against between the second base and the second operating part so that the second operating part has a tendency to move back to an initial status driving the first operating part.

* * * * *